No. 714,947. Patented Dec. 2, 1902.
W. S. PROSKEY.
HYDROCARBON VAPOR INCANDESCENT LAMP.
(Application filed Sept. 4, 1900.)
(No Model.) 2 Sheets—Sheet 2.

Witnesses:
Raphael Netter
M. Lawson Dyer

Winfield Scott Proskey, Inventor
by Kerr, Page & Cooper, Att'ys

UNITED STATES PATENT OFFICE.

WINFIELD SCOTT PROSKEY, OF OCALA, FLORIDA, ASSIGNOR TO MUNICIPAL LIGHTING COMPANY, A CORPORATION OF NEW JERSEY.

HYDROCARBON-VAPOR INCANDESCENT LAMP.

SPECIFICATION forming part of Letters Patent No. 714,947, dated December 2, 1902.

Application filed September 4, 1900. Serial No. 28,883. (No model.)

*To all whom it may concern:*

Be it known that I, WINFIELD SCOTT PROSKEY, of Ocala, in the county of Marion and State of Florida, have invented certain new and useful Improvements in Hydrocarbon-Vapor Incandescent Lamps, of which the following is a full, clear, and exact description, reference being had to the drawings accompanying and forming a part of the same.

My invention pertains to that class of lamps in which a volatile hydrocarbon oil is vaporized and mixed with atmospheric air prior to its ignition and is burned in the presence of a refractory substance capable of being heated to incandescence. The vaporization of the oil is effected after the first ignition by the heat of the flame of the lamp itself. Such devices include a supplementary burner similar in principle to those shown in applications previously filed by myself connected with a supply of a readily-inflammable fuel, such as water-gas or carbureted air, for vaporizing the first supply of vapor delivered to the main burner or burners of the lamp.

The improvements which are the subject of my present application include generally means for igniting from a distance the supplementary burner, means for rendering the vaporizer more effective and constant in action, and means for more thoroughly mixing the hydrocarbon vapor with atmospheric air and superheating the mixture before its delivery to the main burners of the lamp, together with various incidental improvements, as will be explained.

Figure 1:
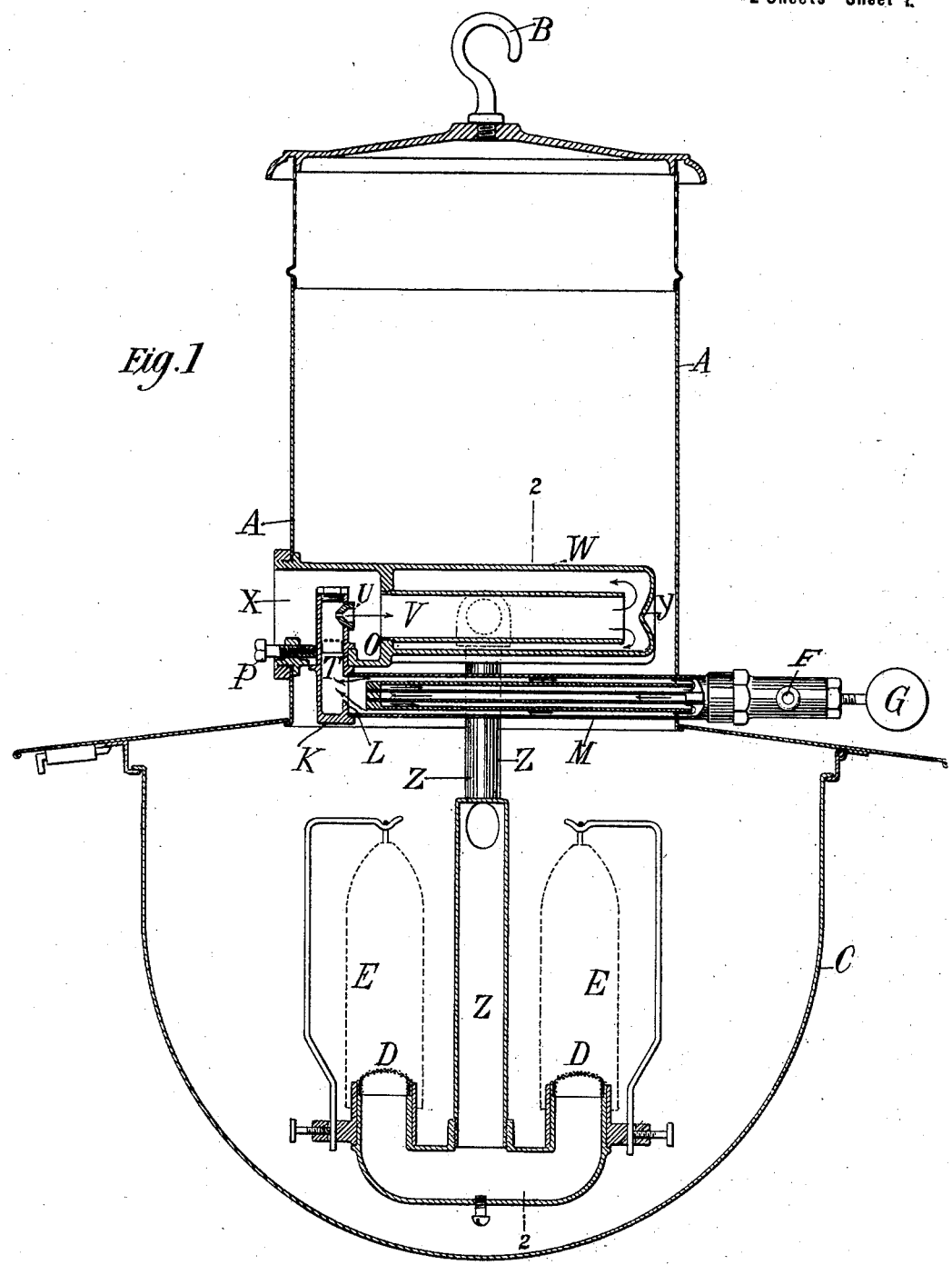
Figure 2:
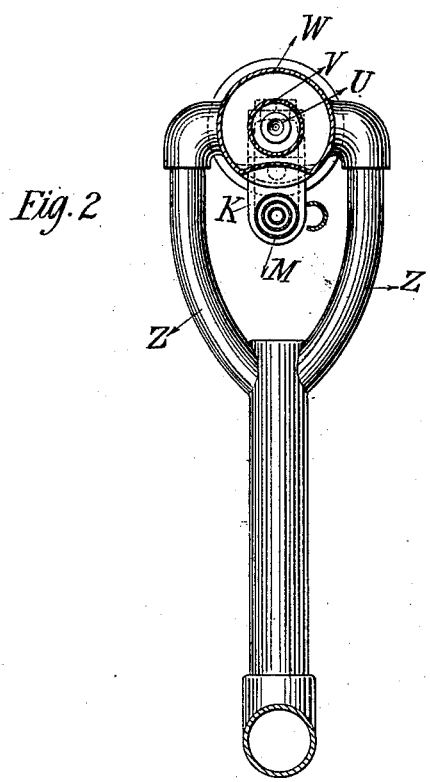
Figure 3:
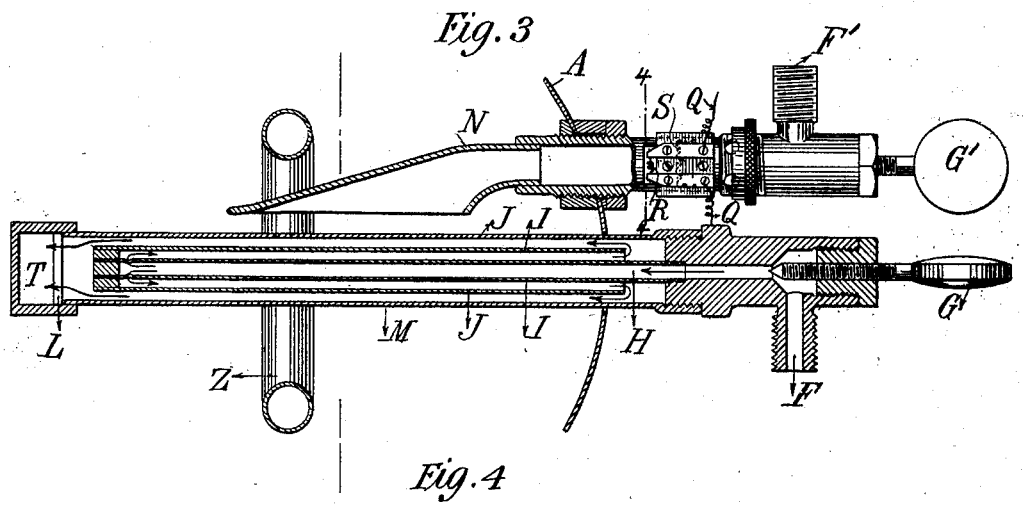
Figure 4:
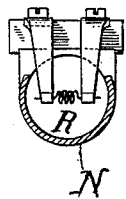

In the drawings, Figure 1 is a longitudinal section of a lamp containing my invention. Fig. 2 is a section on the line 2 2 of Fig. 1. Fig. 3 is a detail, on an enlarged scale and chiefly in section, of the vaporizer and supplementary burner. Fig. 4 is a section on the line 4 4 of Fig. 3.

A represents the casing of a hydrocarbon-vapor lamp, provided with means for its suspension, as a hook B. In the lower part of the lamp is a glass globe C, which incloses the vapor-burners D D, these being arranged to heat to incandescence the mantles E E in the ordinary manner.

F is a pipe or inlet connected with a source of hydrocarbon oil, subject to regulation by a valve G.

M is a vaporizer comprising a plurality of concentric chambers or passages H I J, the inner one H (which is farthest removed from the burners E E and N) being in communication with the passage F. The vaporizer M is detachably secured to the pipe F, as by screw-threads, (see Fig. 3,) and its inner end is mounted in a setting device K, which is supported upon a bracket O, being removably secured in place by a set-screw P, which projects from the casing A of the lamp. By loosening the screw P the setting device K, with vaporizer M, may be removed when it is desirable.

At one side of the vaporizer M is a supplementary burner N, connected by a pipe F' with a source of suitable fuel, as carbureted air, gas, &c., the supply being regulated by a cock G'. (See Fig. 3.) The object of this, as will be readily understood, is to afford means for preliminarily heating the vaporizer M to furnish vapor for lighting the burners D. In the tube of this burner N, I insert an electric igniting device capable of being operated from a distance by closing a circuit Q. The igniting device may consist, as shown, of a coil of fine platinum wire R or other substance capable of being heated, in the passage of an electric current, to incandescence. This is suitably insulated and connected with a battery or other source of electricity. Just behind the igniting device R, I may place a screen of fine wire-gauze S or other means of preventing the gas, &c., on being ignited from "flashing" back to the reservoir. The burner N may, as shown, consist of a tube bent down toward the vaporizer and cut on the bias, as shown, or it may be arranged otherwise so as to cover the greatest possible area of the vaporizer.

The part N of the supplemental burner consists of a shield or guard, as shown and described, arranged to overlie or cover a relatively large portion of the vaporizer and direct the flame from the supplemental burner directly upon the vaporizer.

In the setting device K, I provide a passage T, communicating at one end with the outer chamber J of the vaporizer, a deflector L being provided, if desired, to direct the current of vapor upwardly and which acts as well to remove particles of carbon from the vapor, since they will strike against it and fall back into the end of the vaporizer. (See Fig. 1.) At the upper end passage T communicates through a valve U with the interior of the mixing tube or chamber V. An opening X to the outer air behind valve U enables the vapor to draw atmospheric air freely with it into chamber V, from the opposite end of which the mixed air and gas flows into a fixing and superheating drum W. A double deflecting-surface Y may be arranged opposite the inner end of chamber V to direct properly the mixed air and gas into the superheating-drum. From the drum W passages Z Z furnish communication with the burners D in the ordinary manner.

The cock G' is turned on slightly to introduce a small flow of fuel into the auxiliary burner N, and at the same time the electric circuit Q is closed, so as to heat the platinum core R, which being confined in the tube N is readily heated to incandescence, and thus lights the burner N. On turning the cock G' hydrocarbon oil is allowed to flow into the inner passage H of the vaporizer M, thence (following the arrows in Fig. 3) through the middle and outer chambers I J, which are closer to the source of heat, thereby being subjected to a temperature which rises gradually to the point of vaporization of the oil. The vapor thus produced expands out into the passage T, any particles of carbon carried by the gas tending to drop in the pocket behind the deflector L. From the passage T the gas forces itself through the port U (which may, if desired, be provided with a needle-valve, as will be understood readily) and into the mixing-chamber V, drawing with it air admitted through the opening X. The vapor, being mixed in the drum V, dried, and further heated in the superheating-drum W, feeds downward continuously through the passages Z Z to the burners D D, where it is lighted as it rises by the flame of the burner N. As soon as the burners D are lighted they operate the vaporizer and the auxiliary burner may be turned off.

Many practical advantages over previous constructions reside in my improved lamp, the chief of which are the construction and arrangement of the vaporizer M to effect the continuous and gradual vaporization of the oil and to facilitate its removal when necessary for cleansing, the provision of deflectors L and Y to direct properly the flow of the vapor, the provision of means to remove particles of carbon from the vapor, the addition of an automatic lighting device and of safety-screen S therefor for the auxiliary burner N, and the arrangement of this burner N to heat as large an area as may be of the vaporizer.

I do not desire to limit myself in any way to the details of construction of the various parts described, as I consider them capable of modification in various ways from the types illustrated in the drawings.

What I claim as my invention is—

1. In a hydrocarbon-vapor lamp, the combination with the burner, of a vaporizer above the burner, a mixing-tube adjacent to the vaporizer, and a superheating-drum concentric to the mixing-tube in communication therewith and with the burner, as and for the purpose set forth.

2. In a hydrocarbon-vapor lamp, the combination with the burner, of a vaporizer comprising a series of intercommunicating chambers, a mixing-tube adjacent the vaporizer, and a superheating-drum concentric to the mixing-tube in communication therewith and with the burner, as and for the purpose set forth.

3. In a hydrocarbon-vapor lamp, the combination of a vaporizer comprising a series of intercommunicating chambers gradually approaching the source of heat, a mixing-chamber communicating with the last of the chambers of the vaporizer, a superheating-chamber arranged concentric to said mixing-chamber, and passages leading from said superheating-chamber to the lamp-burners, substantially as and for the purposes described.

4. In a hydrocarbon-vapor lamp, the combination of a vaporizer, a removable setting device for locating and supporting said vaporizer, a passage through said setting device communicating at one end with said vaporizer and at the other with a mixing-chamber, and a deflector between said vaporizer and said setting device, as and for the purpose set forth.

WINFIELD SCOTT PROSKEY.

Witnesses:
  M. LAWSON DYER,
  DRURY W. COOPER.